United States Patent [19]

Heinemann et al.

[11] Patent Number: 4,902,570
[45] Date of Patent: Feb. 20, 1990

[54] PROCESS FOR PREPARING HIGHLY DISPERSED METAL OXIDES WHOSE SURFACES ARE MODIFIED BY AN AMMONIUM-FUNCTIONAL ORGANOPOLYSILOXANE AS A POSITIVE CHARGEABLE CONTROLLING AGENT FOR TONERS

[75] Inventors: Mario Heinemann; Johann Bindl, both of Burghausen; Johann Doppelberger, Emmerting; Hans P. Scherm, Kempten, all of Fed. Rep. of Germany

[73] Assignee: Wacker-Chemie GmbH, Munich, Fed. Rep. of Germany

[21] Appl. No.: 164,286

[22] Filed: Mar. 4, 1988

[30] Foreign Application Priority Data

Mar. 6, 1987 [DE] Fed. Rep. of Germany ....... 3707226

[51] Int. Cl.$^4$ .............................................. G03G 9/10
[52] U.S. Cl. .................................. 428/405; 430/110; 427/214; 427/220; 427/221
[58] Field of Search ....................... 427/220, 221, 214; 430/110; 428/405

[56] References Cited

U.S. PATENT DOCUMENTS

| | | | |
|---|---|---|---|
| 4,229,903 | 11/1981 | Au Clair | 430/110 |
| 4,568,625 | 2/1986 | Uchiyama | 430/110 |
| 4,734,350 | 3/1986 | Lin | 430/110 |
| 4,741,984 | 5/1988 | Imai | 430/110 |

FOREIGN PATENT DOCUMENTS 0026952  2/1985  Japan ................... 430/110

*Primary Examiner*—Sam Silverberg

[57] ABSTRACT

The invention relates to a process for preparing highly dispersed metal oxides whose surfaces are modified by an ammonium-functional organopolysiloxane as a charge controlling substance for positive chargeable toners, in which the highly dispersed metal oxides are reacted with an organopolysiloxane which contains silicon-bonded terminal hydroxyl and/or alkoxy groups, diorganosiloxane units, in which the two organic radicals are monovalent hydrocarbon radicals, and siloxane units in which the organic radicals contain a positive charged nitrogen which is bonded to silicon via carbon.

17 Claims, No Drawings

PROCESS FOR PREPARING HIGHLY DISPERSED METAL OXIDES WHOSE SURFACES ARE MODIFIED BY AN AMMONIUM-FUNCTIONAL ORGANOPOLYSILOXANE AS A POSITIVE CHARGEABLE CONTROLLING AGENT FOR TONERS

The present invention relates to highly dispersed metal oxides, and more particularly to a process for preparing highly dispersed metal oxides, which act as a positive charged controlling agent for toners.

BACKGROUND OF THE INVENTION

Highly dispersed metal oxides having electrostatically positive charging capacity are primarily used as constituents in developers, frequently termed toners, for rendering negative electrostatically charged images visible in processes, such as, for example, electrophotography and electrostatic printing, in which a positive charge is adjusted or regulated.

German Offenlegungsschrift DE-OS- No.3 330 380 describes a pyrogenically produced silicon dioxide modified with an ammonium-functional silane which contains a terminal vinyl group and is known as a positive charged controlling agent for toners. In order, however, to achieve a sufficiently hydrophobic surface, the oxide has to be treated simultaneously or subsequently with suitable hydrophobic agents.

In contrast to the process described in German Offenlegungsschrift DE-OS- No. 3 330 380, the process of this invention not only imparts a highly stable and positive triboelectric charge to the metal oxides when they are used as toners, but also simultaneously imparts a highly hydrophobic orientation to the surface of the modified highly dispersed metal oxides.

It is an object of the present invention to provide highly dispersed hydrophobic metal oxides having high, stable, uniform and positive triboelectric charging capacity as a control agent for positive chargeable toners in a single step. Another object of the present invention is to provide a process for preparing highly dispersed metal oxides which are hydrophobic and have high, stable uniform and positive triboelectric charging capacity as a control agent for positive chargeable toners. A further object of the present invention is to provide highly dispersed metal oxides which may be used as a positive charged controlling agent for toners.

SUMMARY OF THE INVENTION

The foregoing objects and others which will become apparent from the following description are accomplished in accordance with this invention, generally speaking, by providing a process for preparing highly dispersed metal oxides whose surfaces are modified by an ammonium-functional organopolysiloxane as a positive charged controlling agent for toners, which comprises reacting a highly dispersed metal oxide with an organopolysiloxane which contains silicon-bonded terminal hydroxyl and/or alkoxy groups, diorganosiloxane units, in which the two organic radicals are monovalent hydrocarbon radicals, and siloxane units in which the organic radicals contain a positive charged nitrogen which is bonded to silicon via carbon.

DESCRIPTION OF THE INVENTION

All highly dispersed metal oxides which have been, or could have been, used heretofore for the field of application mentioned above can be surface-modified by the process of this invention. The highly dispersed metal oxides may be pyrogenically produced or they may be obtained in a wet chemical manner. Preferably, pyrogenically produced, highly dispersed metal oxides are used. Highly dispersed metal oxides used in accordance with this invention are preferably silicon dioxide, aluminum oxide, titanium oxide, and combined oxides of at least two metals from the group comprising silicon, aluminum and titanium, whose surfaces are untreated, or are treated in a manner known in the art with hydrophobic agents. Preferably, pyrogenically produced, highly dispersed silicon oxide is used in the process of this invention. Pyrogenically prepared silicon dioxide is a known product (cf. German Patent No. 974,793; German Patent No. 974,974; German Offenlegungsschrift 2,620,737). It is prepared, inter alia, by flame hydrolysis of silicon tetrachloride.

Processes for treating highly dispersed metal oxides with hydrophobic agents are described, for example, in German Auslegeschrift No. 1,163,784, German Auslegeschrift No. 2,000,396, German Auslegeschrift No. 2,344,388 and German Offenlegungsschrift No. 2,754,484, where the hydroxyl groups on the surface of the metal oxides are reacted with hydrolyzable groups of organosilicon compounds.

Metal oxides which are used in the present invention are preferably metal oxides produced by flame hydrolysis, and in particular, silicon oxides having the following physicalchemical properties, such as a BET surface area of at least 50 m²/g, preferably from 120 to 500 m²/g, a tamped density of from preferably 20 to 450 g/l, and more preferably 40 to 350 g/l, with an average primary size of preferably from 5 to 80 nm, and more preferably 5 to 30 nm.

The alkoxy groups in the organopolysiloxane used in accordance with this invention are preferably methoxy and ethoxy groups.

The diorganosiloxane units in the organopolysiloxane may be represented by the general formula

where R represents the same or different monovalent hydrocarbon radicals. Preferably, the hydrocarbon radicals contain from 1 to 20 carbon atoms per radical. Examples of suitable hydrocarbon radicals are alkyl radicals, such as the methyl, ethyl, n-propyl, isopropyl, butyl, octyl, tetradecyl and octadecyl radicals; alkenyl radicals such as the vinyl, allyl and hexenyl radicals; cycloaliphatic hydrocarbon radicals, such as the cyclopentyl and cyclohexyl radicals; aromatic hydrocarbon radicals such as the phenyl and naphthyl radicals; alkaryl radicals such as the tolyl radicals; aralkyl radicals such as the benzyl radical and fluoroalkyl radicals such as the trifluoropropyl radical and perfluorohexylethyl radical. Preferably, the hydrocarbon radicals in the diorganosiloxane units consist primarily of methyl radicals because of their availability.

Siloxane units containing organic radicals with a charged nitrogen, which is bonded to silicon via carbon, are those represented by the general formula

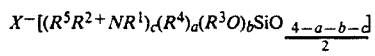

where $R^1$ is a divalent hydrocarbon radical, $R^2$ is hydrogen, or the same, or different alkyl, aryl, aralkyl radicals, $R^3$ is the same or different alkyl radicals containing from 1 to 4 carbon atoms per radical, $R^4$ is a monovalent hydrocarbon radical, $R^5$ is hydrogen or an alkyl radical containing from 1 to 30 carbon atoms or a benzyl radical, $X\ominus$ is an acid anion, a is 1, 2 or 3, b is 1, 2 or 3 and c is 1, 2 or 3.

In a preferred embodiment, the organopolysiloxane used in accordance with this invention contains, in addition to siloxane units having a positive charged nitrogen bonded to silicon via carbon, such as described above, but also contains siloxane units in which the organic radicals have a basic nitrogen bonded to silicon via carbon, which are preferably represented by the general formula

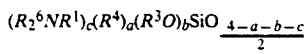

where $R^1$, $R^3$, $R^4$, a, b and c are the same as above and $R^6$ is hydrogen or the same or different alkyl, aryl, aralkyl, alkylaryl, aminoalkyl or aminoaryl radicals.

Examples of divalent hydrocarbon radicals represented by $R^1$ are alkylene radicals, such as the methylene, ethylene, propylene, butylene, cyclohexylene, and octadecylene radicals, as well as arylene radicals such as the phenylene radical. The n-propylene radical is the preferred radical because of its availability. Further examples of $R^1$ radicals are radicals of the formula $-(CH_2)_mCONH-(CH_2)_n-$ and $-(CH_2)_3OCH_2-CH(OH)CH_2-$, where m is preferably in the range of 2 to 10, and n is preferably in the range of from 2 to 4.

The examples of alkyl radicals represented by R are equally applicable as examples for the alkyl radicals represented by $R^4$ and $R^6$.

Examples of ammonium alkyl radicals which correspond to the radical $(R^5R_2{}^2N+R^1)X^-$ are those of the formulas $Cl\ominus(C_2H_5)_3\oplus N-(CH_2)_3-$ $Cl\ominus(CH_3)_3\oplus N-(CH_2)_3-$ $J\ominus(CH_3)_3\oplus N-(CH_2)_3-$ $J\ominus(C_2H_5)_3\oplus N-(CH_2)_3-$ $Cl\ominus(CH_3)_2(CH_2C_6H_5)\oplus N-(CH_2)_3-$ $Cl\ominus(n-C_4H_9)_3\oplus N-(CH_2)_3-$ $Cl\ominus(C_{12}H_{25})(CH_3)_2\oplus N-(CH_2)_3-$ $Cl\ominus(C_{17}H_{35})(CH_3)_2\oplus N-(CH_2)_3-$ $Cl\ominus(C_{18}H_{37})(CH_3)_2\oplus N-(CH_2)_3-$ $Cl\ominus H_3\oplus N(CH_2)_2\oplus NH_2(CH_2)_3-Cl\ominus$ $Cl\ominus C_4H_9\oplus NH_2CH_2CH_2\oplus NH_2CH_2CH_2-Cl\ominus$ Examples of aminoalkyl radicals which correspond to the radical $(R_2{}^6N-R^1)$ are those of the formulas $H_2N(CH_2)_3-$ $H_2N(CH_2)_2NH(CH_2)_3-$ $H_2N(CH_2)_2-$ $(H_3C)_2N(CH_2)_2-$ $H_2N(CH_2)_5-$ $C_4H_9NHCH_2CH_2NHCH_2CH_2-$

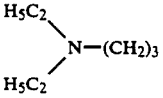

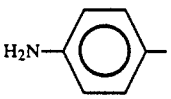

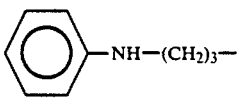

Preferably, the organopolysiloxanes used in accordance with this invention have a kinematic viscosity of from 5 to 500 mm²/s at 25° C., and more preferably from 10 to 100 mm²/s at 25° C. The ratio of the siloxane units having the above formula to diorganosiloxane units of the general formula $R_2SiO$ is preferably from 1:1000 to 1:1, and more preferably from 1:30 to 1:2.

The organopolysiloxanes used in accordance with this invention are well known and their preparation is described, for example, in W. Noll, Chemistry and Technology of Silicones, Academic Press Inc., Orlando 1968, in which compounds of the general formula $HO-(SiR_2O)_nH$ and/or $(SiR_2O)_n$ are reacted with compounds of the general formula $[(R^3O)_3SiR^1N+R_2{}^2R^5]X^-$ and optionally $(R^3O)_3SiR^1NR_2{}^6$, where R, $R^1$, $R^2$, $R^3$, $R^5$, $R^6$ and $X^-$ are the same as above, and n preferably is in the range of from 1 to 1000, and more preferably from 1 to 300.

The organosilylammonium compounds are well known and may be prepared in accordance with German Auslegeschrift No. 2,229,580, in which alkoxysilylalkyl halides are reacted with amines, such as tertiary amines.

A further process for preparing the ammonium-functional radicals in the organopolysiloxane consists in the protonation of the aminoalkyl groups with acids. Examples of acids are hydrogen halide acids and other inorganic or organic acids.

In the process of this invention, preferably from 1 to 50 percent by weight, and more preferably from 5 to 30 percent by weight of organopolysiloxane, based on the weight of the highly dispersed metal oxide is used.

The organopolysiloxane is preferably employed in an alcoholic solution, preferably alcohols having from 1 to 5 carbon atoms, and more preferably methanol, ethanol, isopropanol or mixtures thereof. Depending on the solubility and the properties of the reaction products formed, the content of organopolysiloxane in the solution is preferably from 1 to 90 percent by weight, and more preferably from 10 to 50 percent by weight.

The highly dispersed metal oxides used in accordance with this invention are preferably used in the solid phase, i.e., in the absence of a solvent. They may, however, also be dispersed in organic solvents.

In accordance with a preferred embodiment of this invention, basic compounds may also be used for activating the highly dispersed metal oxides used in accordance with this invention, and in particular, for highly dispersed silicon dioxide. Ammonia is preferably the basic compound used in this invention. The basic compounds are preferably used in an amount of from 1 to 10 percent by weight, based on the highly dispersed metal oxide.

The crosslinking of the organopolysiloxane applied to the highly dispersed metal oxide is carried out at temperatures in the range of from 20° to 250° C., and preferably in a range of from 80° to 220° C.

Any suitable mixing vessel may be used for the reaction, for example, pneumatic mixers, mixers with rotating mixing tools which provide for vigorous agitation of the substance with rotating paddles, blades or pins. Preferred mixers are plough bar mixers, Henschel mixers, edge mills and ball mills. The alcoholic solution containing the organopolysiloxane can be added to the metal oxide introduced into the mixing equipment in any suitable manner, preferably via atomizers or in simple cases by dropwise addition.

After mixing, the resultant flowable powder is kept, depending on the temperature, for a few minutes to several hours, preferably from 0.5 to 6 hours at a temperature of preferably from 80° to 250° C. Any suitable apparatus, for example, a circulating-air drying oven, a heated mixer, or in particular, a plate dryer may be used for this purpose.

The triboelectric charging capacity, the hydrophobic properties and the flow and trickle properties of the highly dispersed metal oxides obtained by the process of this invention can be adjusted or regulated to required values by a suitable choice of the highly dispersed metal oxides and organopolysiloxanes used in accordance with this invention.

The highly dispersed metal oxides having organopolysiloxane modified surfaces which are obtained in accordance with this invention act as positive charged controlling agents in toners. The positive triboelectric charging capacity was measured by the blow-out method described in Japan Soc. of Color Materials, page 630, 1982.

In order to measure the triboelectric charge, that is to determine the charge/mass ratio (Q/m), the "model toner" consisted, for reasons of clarity, only of the carrier particle/highly dispersed metal oxide system. The carrier particle, as a rule, was a spheroidal uncoated iron oxide powder (particle size 50 to 85μm) and the weighed amount of highly dispersed metal oxide was 1 percent. Before the Q/m measurement, the carrier/silicic acid system was activated on a roller block in a polyethylene bottle. The charge values varied for a given carrier particle between +10 μC/g and +300 μC/g, depending on the organopolysiloxane used to modify the surface of the highly dispersed metal oxides.

Similar to the two-component developement system, in which the triboelectric charging effect on the highly dispersed metal oxides is produced by the carrier particles, the above mentioned highly dispersed metal oxides whose surfaces are modified with ammonium-functional organopolysiloxane may be used as control substances for positive chargeable toners in a single-component system.

The highly dispersed metal oxide used as charge regulating agent and modified in the manner described above must have a sufficiently hydrophobic behavior in order to act as a charge control substance for imprinting a positive electrostatic charge. To evaluate the hydrophobic properties, use is made of the wetting behavior towards methanol, expressed in methanol numbers. The methanol titration is carried out in the following manner.

About 0.2 g of product is added to 50 ml of distilled water placed in a 250 ml beaker. Methanol is added dropwise from a burette whose tip is immersed in the liquid until the entire amount of the surface modified, highly dispersed metal oxide is wetted. At the same time, continuous slow stirring is carried out using a magnetic stirrer. The degree of hydrophobicity (methanol number) is calculated from the quantity of methanol, expressed in milliliters, which is required for complete wetting using the equation:

$$\text{Methanol number} = \frac{a}{50 + a} \times 100$$

Various embodiments of this invention are further illustrated in the following examples.

EXAMPLE 1

About 80 parts by weight of a highly dispersed silicic acid which was pyrogenically prepared and which has a specific surface area of 170 m$^2$/g according to the BET method, a tamped density of 90 g/l and whose surface carries chemically bonded dimethylsiloxane groups is activated in an edge mill with 5 parts by weight of a 25 percent aqueous ammonia solution at 25° C. During milling, 20 parts by weight of a 40 percent methanol/isopropanol mixture containing a reaction product of a dimethylpolysiloxane having one Si-bonded hydroxyl group in each of the terminal units and having a viscosity of 100 mPa.s at 25° C., a silane of the formula $$H_2N(CH_2)_2NH(CH_2)_3Si(OCH_3)_3$$

and 0.3 parts by weight of a 37 percent HCl are reacted with the above mentioned silicic acid at 35° C., in which the reaction product has an amine number (number of ml of 1 N HCl which are required to neutralize 1 g of substance) of 2.9 and a viscosity of 51 mPa.s at 25° C. After milling for 6 hours, the reaction product is freed of the solvent by transfer to a plate dryer at 130° C. under inert conditions. A completely hydrophobic, free-flowing powder is obtained having the following properties:

| | |
|---|---|
| Specific surface area (BET method) | 108 m$^2$/g |
| Degree of hydrophobicity in methanol numbers | 64 |
| Carbon content, percent by weight | 6.4 |
| Tamped density (DIN 53,194) | 167 g/l |
| Triboelectric charge* | +188 uC/g |

(*Measurement conditions: 100 g of iron oxide carrier particles type X-28 manufactured by Dowa Mining, Japan; 1 g of product; activation time 30 min; screen 50 μm; quantity of nitrogen 1 l/min.
Measuring instrument: TB-200, Toshiba Chemical, Tokyo, Japan).

EXAMPLE 2

Example 1 was repeated except that a highly dispersed silicic acid which has chemically bonded dimethylsiloxy units on the surface and has a specific surface area of 200 m²/g according to the BET method and a tamped density of 90 g/l was used. In this example, the polysiloxane had an amine number of 3.3. A completely hydrophobic, free-flowing powder is obtained having the following properties:

| | |
|---|---|
| Specific surface area (BET method) | 118 m²/g |
| Degree of hydrophobicity in methanol numbers | 65 |
| Carbon content, percent by weight | 6.6 |
| Tamped density (DIN 53,194) | 186 g/l |
| Triboelectric charge* | +239 uC/g |

(*Measured in accordance with the procedure described in Example 1).

EXAMPLE 3

Example 1 was repeated, except that a highly dispersed silicic acid which has chemically bonded dimethylsiloxy units on the surface and has a specific surface area of 120 m²/g according to the BET method and a tamped density of 90 g/l was used.

A completely hydrophobic, free-flowing powder is obtained having the following properties:

| | |
|---|---|
| Specific surface area (BET method) | 95 m²/g |
| Degree of hydrophobicity in methanol numbers | 64 |
| Carbon content, percent by weight | 4.3 |
| Tamped density (DIN 53,194) | 230 g/l |
| Triboelectric charge* | +180 uC/g |

(*Measured in accordance with the procedure described in Example 1).

EXAMPLE 4

In an intensive powder mixer, 80 parts of a highly dispersed, pyrogenically prepared, silicic acid having a specific surface area of 200 m²/g according to the BET method, a tamped density according to DIN 53,194 of 40 g/l, and whose surface contains chemically bonded dimethylsiloxy groups, was activated with 5 parts of a 25 percent aqueous ammonia solution at 25° C. and reacted at 35° C. with 20 parts of a 40 percent methanol-/isopropanol mixture containing a reaction product of a dimethylpolysiloxane having one Si-bonded hydroxyl group in each terminal unit and having a viscosity of 100 mPa.s at 25° C., a silane of the formula $(CH_3O)_3Si(CH_2)_3NH(CH_2)_2NH_2$ and 0.3 parts of 37 percent aqueous HCl, in which the reaction product has an amine number of 2 and a viscosity of 60 mPa.s at 25° C. The alcoholic solution of the above mentioned reaction product is sprayed onto the silicic acid. After mixing for 20 minutes, the reaction product is freed of the solvent by transfer to a ventilated dryer at 130° C. under inert conditions.

A completely hydrophobic, free-flowing powder is obtained having the following properties:

| | |
|---|---|
| Specific surface area (BET method) | 115 m²/g |
| Degree of hydrophobicity in methanol numbers | 63 |
| Carbon content, percent by weight | 4.4 |
| Tamped density (DIN 53,194) | 64 g/l |
| Triboelectric charge* | +140 uC/g |

(*Measurement conditions: 50 g of iron oxide carrier particles type A manufactured by Tomoegawa, Japan; 0.5 g of product; activation time 10 min; screen 50 μm; quantity of air 1 l/min.
Measuring instrument: Q/m meter type 04, manufactured by Dr. R. H. Epping, Munich, FRG).

EXAMPLE 5

The procedure of Example 4 was repeated, except that a reaction product containing the above components and having an amine number of 3.3 and a viscosity of 37 mPa.s at 25° C. was used.

A completely hydrophobic, free-flowing powder is obtained having the following properties:

| | |
|---|---|
| Specific surface area (BET method) | 110 m²/g |
| Degree of hydrophobicity in methanol numbers | 68 |
| Carbon content, percent by weight | 5.9 |
| Tamped density (DIN 53,194) | 68 g/l |
| Triboelectric charge* | +270 uC/g |

(*Measured in accordance with the procedure described in Example 4).

EXAMPLE 6

The procedure of Example 4 was repeated, except that 80 parts of highly dispersed silicon dioxide were reacted with 20 parts of a 40 percent methanol/isopropanol mixture of a reaction product containing a dimethylpolysiloxane and a silane of the formula $(CH_3O)_3Si(CH_2)_3N^+(CH_2)_2(CH_{18}H_{37})Cl^-$, where the diorganosiloxane units are in a ratio of 8:1 to the siloxane units with organic radicals containing positively charged nitrogen and bonded to silicon via carbon.

A completely hydrophobic, free-flowing powder is obtained having the following properties:

| | |
|---|---|
| Specific surface area (BET method) | 117 m²/g |
| Degree of hydrophobicity in methanol numbers | 61 |
| Carbon content, percent by weight | 7.2 |
| Tamped density (DIN 53,194) | 59 g/l |
| Triboelectric charge* | +76 uC/g |

(*Measured in accordance with the procedure described in Example 4).

EXAMPLE 7

The procedure of Example 4 was repeated, except that the silicon dioxide was reacted at 35° C. with 20 parts of a 40 percent methanol/isopropanol mixture of a reaction product containing methylphenylpolysiloxane having a viscosity of 1000 mPa.s at 25° C. and a silane of the formula $(CH_3O)_3Si(CH_2)_3NH(CH_2)_3NH_2$ and 0.3 parts by weight of 37 product HCl, in which the reaction product has an amine number of 3.1 and a viscosity of 400 mPa.s at 25° C.

A completely hydrophobic, free-flowing powder is obtained having the following properties:

| | |
|---|---|
| Specific surface are (BET method) | 124 m²/g |
| Degree of hydrophobicity in methanol numbers | 57 |
| Carbon content, percent by weight | 8.5 |
| Tamped density (DIN 53,194) | 54 g/l |
| Triboelectric charge* | +10 uC/g |

(*Measured in accordance with the procedure described in Example 4).

EXAMPLE 8

The procedure of Example 4 was essentially repeated, except that a highly dispersed ammonium oxide (type Alox C, manufactured by Degussa, Rheinfelden, FRG) was substituted for the highly dispersed silicic acid. The physical properties of the resultant product are as follows:

| | |
|---|---|
| Specific surface area (BET method) | 91 m$^2$/g |
| Degree of hydrophobicity in methanol numbers | 66 |
| Carbon content, percent by weight | 4.4 |
| Temped density (DIN 53,194) | 128 g/l |
| Triboelectric charge* | +93 uC/g |

(*Measured in accordance with the procedure described in Example 4).

What is claimed is:

1. A process for preparing highly dispersed metal oxides having their surfaces modified by an ammonium-functional organopolysiloxane as a positive charged controlling agent for toners, which comprises reacting highly dispersed metal oxides with an organopolysiloxane containing silicon-bonded terminal groups selected from the group consisting of hydroxyl groups, alkoxy groups, and mixtures thereof, diorganosiloxane units, in which the organic radicals are monovalent hydrocarbon radicals, and siloxane units in which the organic radicals contain a positive charged nitrogen which is bonded to silicon via carbon.

2. The process of claim 1, wherein the organopolysiloxane contains siloxane units in which the organic radicals contain a positive charged nitrogen and basic nitrogen which is bonded to silicon via carbon.

3. The process of claim 1, wherein a highly dispersed pyrogenically produced metal oxide is used.

4. The process of claim 2, wherein a highly dispersed pyrogenically produced metal oxide is used.

5. The process of claim 1, wherein the highly dispersed metal oxide is selected from the group consisting of silicon dioxide, aluminum oxide, titanium oxide and mixtures thereof.

6. The process of claim 2, wherein the highly dispersed metal oxide is selected from the group consisting of silicon dioxide, aluminum oxide, titanium oxide and mixtures thereof.

7. The process of claim 3, wherein the highly dispersed pyrogenically produced metal oxide is selected from the group consisting of silicon dioxide, aluminum oxide, titanium oxide and mixtures thereof.

8. The process of claim 4, wherein the highly dispersed pyrogenically produced metal oxide is selected from the group consisting of silicon dioxide, aluminum oxide, titanium oxide and mixtures thereof.

9. The process of claim 1, wherein the highly dispersed metal oxide is silicon dioxide and is pretreated with a hydrophobic agent.

10. The process of claim 2, wherein the highly dispersed metal oxide is silicon dioxide and is pretreated with a hydrophobic agent.

11. The process of claim 3, wherein the highly dispersed pyrogenically produced metal oxide silicon dioxide and is pretreated with a hydrophobic agent.

12. The process of claim 4, wherein the highly dispersed pyrogenically produced metal oxide silicon dioxide and is pretreated with a hydrophobic agent.

13. The process of claim 1, wherein the highly dispersed metal oxide is a pyrogenically produced silicon dioxide.

14. The process of claim 2, wherein the highly dispersed metal oxide is a pyrogenically produced silicon dioxide.

15. The process of claim 4, wherein the highly dispersed metal oxide is a pyrogenically produced silicon dioxide.

16. The process of claims 1, 2, 3, 4, 5, 6, 7, 8, 9, 10, 11, 12, 13, 14 or 15, wherein the amount of organopolysiloxane ranges from 1 to 50 percent by weight based on the weight of the highly dispersed metal oxide.

17. A positive charged controlling agent for toners, which is obtained from the process of claims 1, 2, 3, 4, 5, 6, 7, 8, 9, 10, 11, 12, 13, 14, 15 or 16.

* * * * *